Oct. 21, 1952 F. G. PASOTTI 2,614,739
VACUUM PACK MACHINE
Filed Aug. 30, 1946 5 Sheets-Sheet 1

Fig.1

INVENTOR
Felice G. Pasotti
BY Green McCallister & Miller,
HIS ATTORNEYS

Oct. 21, 1952   F. G. PASOTTI   2,614,739
VACUUM PACK MACHINE
Filed Aug. 30, 1946   5 Sheets-Sheet 2

INVENTOR
Felice G. Pasotti
BY
Green McCallister & Miller,
HIS ATTORNEYS

Patented Oct. 21, 1952

2,614,739

UNITED STATES PATENT OFFICE 2,614,739

VACUUM PACK MACHINE

Felice George Pasotti, Muncie, Ind., assignor to Ball Brothers Company, a corporation of Indiana Application August 30, 1946, Serial No. 694,132

19 Claims. (Cl. 226—82)

This invention relates to vacuum pack machines, i. e., machine capable of withdrawing all or substantially all of the air from the interior of a receptacle—such as a food container—and for sealing the receptacle by means of an applied closure while the interior thereof is thus subjected to sub-atmospheric or vacuum pressure.

An object of the invention is to produce a vacuum pack machine which is highly effective and which may be employed in the operation of vacuum packing light, dry materials, such for example as finely ground coffee, as well as other materials, such for example as peanut butter, salad dressings, mayonnaise, etc.

A further object of the invention is to produce such a machine which is of relatively simple construction and is capable of receiving containers from a conveyor mechanism, exhausting the air from each such container and then hermetically sealing it and all without occasioning objectionable movement of the food substance or other material within the container, and independently of the type or character of such material.

A further object is to produce a machine of the character here described in which the steps of moving a receptacle to place on the machine, vacuumizing the interior thereof, hermetically sealing the container and then delivering it to a conveyor or receiving table, are all accomplished automatically and at a rate such as to keep pace with modern bottle or container filling machines.

These and other objects are attained by means of apparatus embodying the features herein described and illustrated in the accompanying drawings in which.

The machine illustrated as an embodiment of my invention is adapted to receive jars or similar containers, having closures loosely applied or fitted thereto. The machine is provided with a selector device which cooperates with a conveyor in such a way as to separate a container from others on the conveyor and move it onto a rotating table where it is accurately positioned below a mechanism which, in the illustrated embodiment may be termed a "combined vacuum-applying and closure sealing mechanism." While any convenient number of these mechanisms may be employed, the machine illustrated is equipped with four such mechanisms, spaced 90° apart with relation to the rotating table, and all four are movable with the table.

During each rotation of the table, each such mechanism moves downwardly to engage a container in such a way as to enclose the neck finish thereof and, consequently, the closure loosely fitted thereon, within a vacuum-applying device, which I refer to as an "air bell." This downward movement also contributes to the engagement of the cover-securing means with a cover loosely fitted to the container and is a preliminary to moving the closure to a position such that it hermetically seals the interior of the container.

The air bell is provided with a ring-shaped gasket or lip which engages the exterior surface of the container in such a way as to seal the interior of the bell and, consequently, the interior of the container. Air is then exhausted from both the bell and the container. After a high or substantially absolute vacuum is thus established within the container, the closure is moved to final position on the container, thus hermetically sealing the container while its interior—and the interior of the air bell—are subjected to vacuum pressure. During these operations, the container is moving with the rotating table and after it has reached a predetermined position, the combined vacuum-applying and closure-sealing device is lifted out of contact with it and the container is moved from the table onto a conveyor or other receiving device.

A feature of my invention is that the air pressure is gradually reduced within the container and under conditions such that a high vacuum is eventally applied to the interior thereof but without unduly disturbing (causing excessive movement of) the food or other material in the container. This is particularly important where dry, fluffy or light material is involved or even where material such as ground coffee is that being subjected to the dry pack procedure.

Difficulty has been encountered in the dry packing of even such materials as ground coffee, due to the fact that the movement of air from the container, in the operation of applying vacuum to the interior thereof, not only causes a movement of the dry material within the container but under some conditions, will occasion movement such that some such material leaves the container and tends to clog the vacuum lines or otherwise prevent an effective sealing of the container while the interior is subjected to vacuum. With my invention the rate of withdrawing the air from each container is controlled and so controlled that substantially a perfect vacuum is obtained within each container, without causing undue or detrimental movement of the material within the container. That is to say, my invention makes it possible to vacuum pack dry and even fluffy material and obtain a high vacuum in each container without removing any of such material from the container.

While vacuum is normally applied to each air bell once during each revolution of the table and as the air bell arrives at a designated position during its movement with the table, a feature of my invention is that vacuum will not be so applied unless the air bell is in engagement with a container and the container is fitted with a closure.

Figure 1:
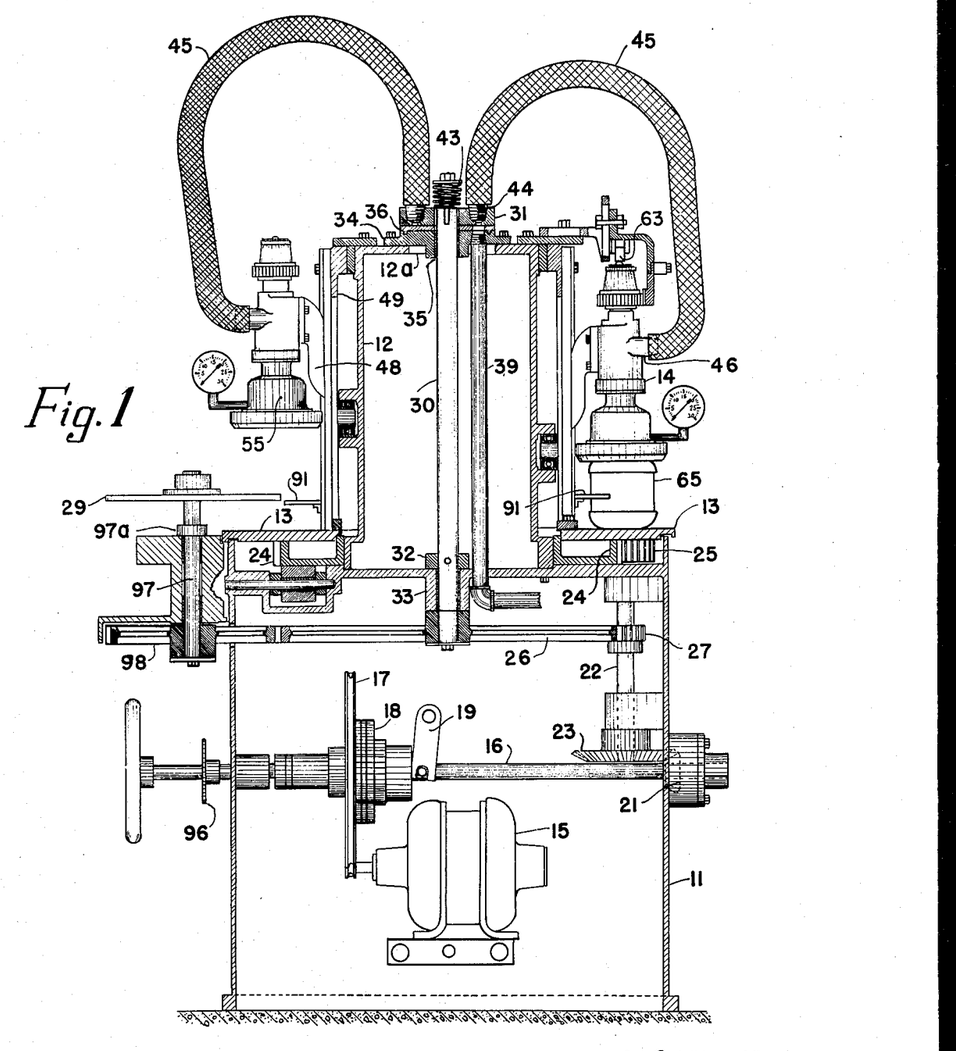
Figure 1 is a vertical sectional elevation of a machine embodying the invention.

Referring to Figure 1, the embodiment of my invention illustrated includes a substantially cylindrical base portion 11 which constitutes a support for a central cylindrical column 12, a rotating table 13 and a combined vacuum-applying, closure-securing mechanism 14 which move with the table.

As shown in Figure 1, the base 11 encloses and supports an electric motor 15 which may constitute the motive power for all the movable parts of the machine. Figure 1 discloses a drive shaft 16 which extends across the interior of the base and is journaled on the cylindrical wall thereof. It is, in effect, the main drive shaft of the machine and is operatively coupled to the motor through the agency of a pulley 17 which is rotatably mounted on the shaft but is positioned thereon by a suitable collar or collars. The pulley 17 is adapted to be operatively coupled to the shaft by a clutch mechanism 18 which is illustrated in Figure 1. One portion of this clutch is shown as formed integrally with the pulley 17 and the other portion is splined to and movable along the shaft 16. I have diagrammatically shown a lever 19 for moving the splined portion of the clutch to operatively secure the pulley 17 to and disconnect it from operative engagement with the shaft 16.

A bevel gear 21 is secured to the shaft 16 and operates a vertical shaft 22 through the agency of a bevel gear 23. A ring gear 24 is secured to the table 13 and a pinion 25, carried by and secured to the shaft 22, meshes with this gear and imparts rotation to the table 13. The shaft 22 also drives what I designate as a "bull gear," 26 through the agency of a pinion 27. As will later be described, the gear 26 actuates a selector plate 28 (Figures 2 and 3) and a delivery plate 29.

As shown in Figure 1, the gear 26 is carried by a vertical shaft 30 which actuates the upper part 31 of a vacuum-applying valve which forms an important detail of the machine. The shaft 30 projects through an aperture formed in the upper wall of the base 11 and is provided with a collar 32 which seats on such wall and constitutes a step bearing for the shaft. The aperture in the upper wall of the base is provided with a depending annular flange 33 which is shown provided with a bearing bushing and constitutes a bearing for the shaft. The gear 26 is secured to the lower end of the shaft 30 which projects downwardly beyond a flange 33.

The shaft 30 is located centrally with relation to the column 12 and extends upwardly through an aperture 12a formed in the top of the column. The aperture 12a is shown as closed by a valve part 34 which is removably secured to the top of the column 12 by bolts or otherwise. The shaft 30 passes through a central aperture 35 formed in the valve part and this aperture is provided with a depending flange and is bushed to provide an upper bearing for the shaft 30.

The valve parts 31 and 34 and a vacuum control plate 36 form a valve which performs the double function of a control valve and also a distributor valve. The parts 31 and 34 form a closure in which the plate 36 is located. This plate is removably secured to the part 34 so that it remains stationary during the rotation of the part 31. It is provided with a specially shaped aperture or slot 36a which cooperates with each of four apertures 31a formed in the part 31 and with an arc-shaped groove 37 formed in the upper face of the part 34, in controlling the rate at which air is withdrawn from a container engaged by each of the devices 14.

Figure 9:
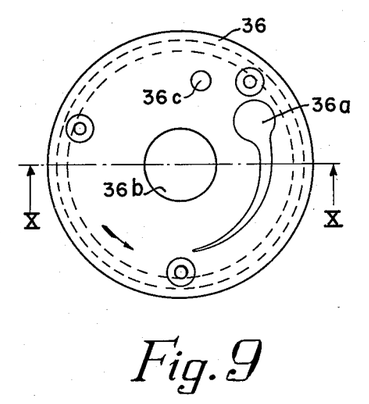
Figure 9 is a plan view of a vacuum control plate which is adapted to cooperate with the parts shown in Figures 5, 6, 7 and 8 in controlling the rate at which the vacuum is applied to each container, prior to the operation of sealing the same.
Figure 10:
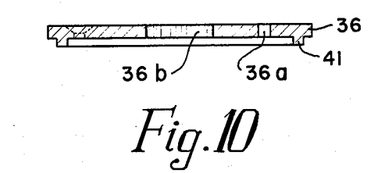
Figure 10 is a sectional view taken through the line X—X of Figure 9.

The valve part 34 is provided with a threaded aperture or port 38 which communicates with the arc-shaped groove 37. Piping 39 is connected to the port 38 and communicates with a source of vacuum (sub-atmospheric pressure) such as a vacuum pump or an exhausted tank, neither of which are shown. As shown in Figures 9 and 10, the vacuum control plate 36 is provided with an annular depending flange 41 which is located adjacent the periphery thereof and is concentric with its central aperture 36b through which the shaft 30 passes. This flange 41 projects into an annular groove 42 formed in the upper face of the valve part 34 and the arrangement is such as to form a substantially fluid tight seal between the plate 36 and the lower valve part 34. With such an arrangement the only means of communication between the groove 37 of the part 34, and each of the ports 31a of the part 31, is the aperture or slot 36a formed in the control plate 36.

As shown in Figure 9, the slot 36a is substantially circular at one end but terminates in an arc-shaped portion which extends circumferentially of the plate but spaced from the periphery thereof. This arc-shaped portion decreases in width along its length and terminates in a theoretical point. The widest part of the arc-shaped portion is adjacent the circular end of the slot and at this point its width is approximately equal to the diameter of each of the apertures 31a of the upper valve part 31. The combined length of the circular portion and the arc-shaped portion of the slot 36a is substantially equal to the circumferential length of the groove 37. The plate 36 is so mounted on the part 34 that the slot 36a registers with the groove 37 and is in direct communication therewith from end to end. The apertures 31a are also so positioned on the valve part 31 that the portion of minimum diameter of each such aperture registers with the slot 36a throughout the entire length of its travel along that slot.

From the foregoing it is apparent that the plate 36 controls communication between each aperture 31a and the groove 37 as the valve part 31 is rotated by the shaft 30. The arrows associated with Figures 7 and 9 disclose the direction of rotation of the valve part 31 with relation to the plate 36. It is, therefore, apparent that full and free communication between each aperture 31a and the groove 37 is not established until each such aperture 31a has traveled in register with the slot 36a throughout an arc of somewhat more than 90°. Full communication between each such aperture 31a and the groove 37 is maintained as the aperture moves in open communication with the circular portion of the slot 36a.

For the purposes of this disclosure, the pipe may be considered as the source of vacuum or subatmospheric pressure and it is, therefore, apparent that each aperture 31a of the valve part 31 is placed in communication with this source once during each revolution of the plate 31 and, consequently, of the table 13. As previously stated, the valve part 31 is splined to the shaft 30. It is, however, movable longitudinally of the shaft and is spring-pressed against the plate 36 by means of a coil spring 43. The coil spring surrounds the upper end of the shaft.

Figure 7:
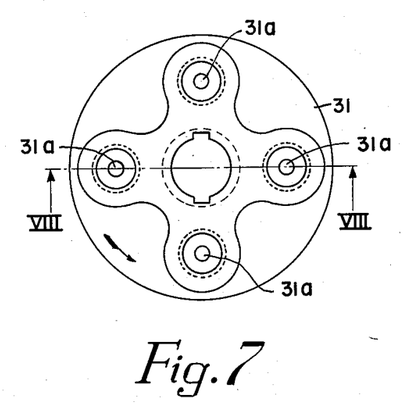
Figure 7 is a plan view of a portion of the vacuum-control valve, which cooperates with the part thereof illustrated in Figures 5 and 6.
Figure 8:
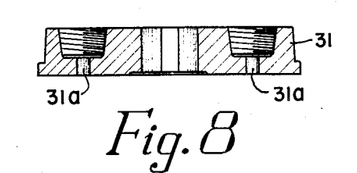
Figure 8 is a sectional view of the part shown in Figure 7; the section being taken along the line VIII—VIII of Figure 7.

As shown in Figures 1, 7 and 8, each of the apertures 31a of the part 31 is countersunk on the upper side of the part and each countersunk portion is threaded to receive a nipple 44. Each device 14 is provided with a nipple 46, as shown in Figures 1 and 4, which is connected by a short length of hose or flexible conduit 45 to one of the nipples 44.

Each combined vacuum-applying, closure-sealing device 14 is so constructed that it, in effect, consists of three essential portions, viz., a housing 47, a vacuum-applying portion and a closure sealing portion. The housing cooperates with and supports both of the last mentioned portions, which are later described in more detail. Each housing 47 is adapted to move up and down during its rotation with the table 13, and is carried by a bracket 48. Each bracket is carried by an upright which forms a part of a rotating frame 49 secured to the table 13 and surrounding the column 12. In the apparatus illustrated, the frame 49 is provided with four vertically extending ways 50, each of which is adapted to receive and guide one of the brackets 48. Each bracket is movable along its supporting way and is formed in two parts, one of which is provided with a stud 51 and is adjustable with relation to the other by means of a worm and rack assembly in which the worm 52 extends vertically (parallel with the supporting way) and is provided at its projecting upper end with a squared head adapted to be employed for rotating it and thus changing the relative vertical positions of the two parts.

Figure 4:
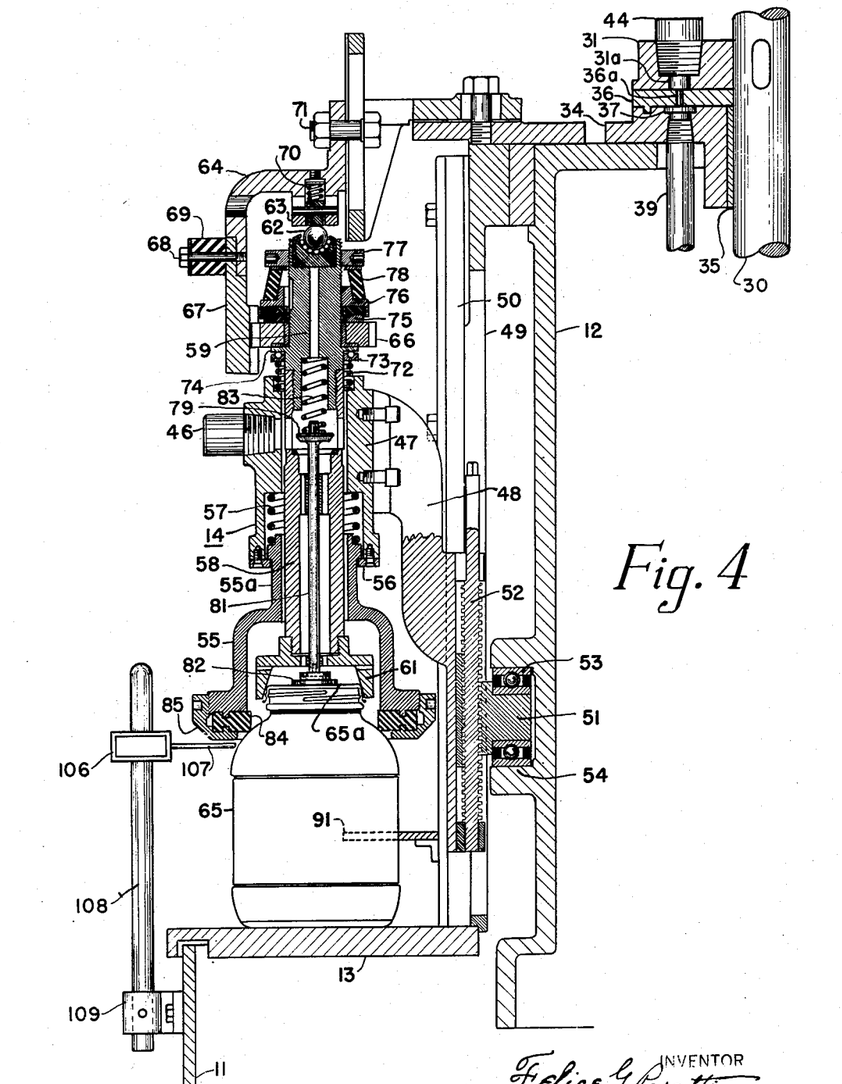
Figure 4 is a fragmental, sectional elevation in which the section is taken on a central plane through an air bell forming a detail of the machine.

The stud 51 carries a ball-bearing supported roller 53 which, as shown in Figures 1 and 4, projects into and engages a cam way 54 carried by the stationary column 12. The cam way is so formed or contoured that it raises and then lowers each bracket 48 as the frame 49 revolves around the column 12. In this way, each housing 47 and, consequently, each device 14 is raised and lowered during each of its revolutions around the column 12. It will be understood that the cam way 54 is so contoured that it and the cam roller 53 occasion a lowering of each device 14 to engage a container shortly after the container is properly positioned on the table 13. The cam roller 53 and way 54 cooperate in raising each device 14 out of contact with the container engaged by it after vacuum has been applied to the interior of the container and a closure has been so secured to the container as to hermetically seal the interior thereof.

By turning the worm 52 of the worm and rack assembly of each bracket 48, the housing 47 and, consequently, the device 14 carried by it, may be raised or lowered to adjust its position with relation to the table 13. This adjustment is for the purpose of enabling the vacuum pack machine to be employed in connection with different sizes of containers. As is apparent, the adjustment for this purpose is, in fact, accomplished by varying the position of the housing engaging portion of the bracket 48 with relation to the corresponding cam roller 53.

As shown in Figure 4, each housing 47 supports an air bell 55 which depends therefrom but is so arranged that it is movable with relation thereto. In the embodiment illustrated, each air bell is provided with a neck portion 55a of less diameter than the bell portion thereof. The upper end of the neck portion projects into the hollow interior of the housing and is provided at its upper end with a collar which is engaged by a ring 56 removably secured to the housing so that it constitutes a shoulder on the housing for limiting the downward movement of the air bell relatively to the housing. A coil spring 57, seated on an annular shoulder formed within the housing, engages the upper end of the neck 55a and yieldingly holds the collar formed thereon in engagement with the ring 56, i. e., yieldingly holds the air bell 55 in its lowermost position with relation to the housing 47. The housing 47 is hollow from end to end.

As previously stated, the housing also supports the closure-sealing mechanism forming a part of each device 14. As shown, this mechanism consists essentially of a closure-engaging cap 61 and an actuating spindle therefor, formed in two parts 58 and 59. The lower part 58 of the spindle supports the cap 61 which, as shown, is located within the confines of the air bell 55. The upper part 59 of the spindle projects above the housing and supports a spherical roller 62 which is adapted to engage a cam or cam way 63 carried by a bracket 64 which is secured to the stationary central column 12. The roller 62 is shown as spherical, i. e., as a ball roller and is supported by a ball bearing. The cam 63, engaged by the roller 62, is relatively short but extends in the direction of movement of the roller 62 as the roller moves with its corresponding mechanism 14, and with the table 13. The cam 63 is so positioned and so contoured that it moves the cap 61 downwardly to engage a closure accomplished through the agency of the two-part spindle 58—59 and is loosely fitted on the container engaged by the air bell. This is a preliminary to moving the closure to a position in which it hermetically seals the interior of the container. This initial movement of the cap 61 may, and in the apparatus illustrated, does take place after the air has been withdrawn from the interior of the container and, consequently, after the air bell has been moved downwardly, by the cooperative action of the cam roller 53 and cam way 54 to engage a container carried by the table 13.

In the drawings I have designated each such container by the numeral 65 and each is provided with a type of closure 65a which is adapted to be screwed onto the neck finish of the container in the operation of sealing the container. Such closures engage screw threads formed on the outer peripheral face of the neck finish and a ring shaped gasket, either separately formed or formed as a part of the closure, seals the joint between the closure and the neck finish when the closure is screwed to place on the container. For this reason, the machine illustrated is arranged to rotate the two part spindle 58—59 and, consequently, the cap 61 after the cap is in engagement with the closure 65a.

In order to accomplish this, a gear 66 is mounted on the spindle part 59 and is adapted to engage a rack 67 while the ball roller 62 is in engagement with the cam 63. The rack is shown as a separate part coupled to the depending end of the bracket 64 and provided with elongated gear teeth, such that the rack will be engaged by the gear 66 throughout the entire movement of the spindle 58—59 occasioned by the engagement of the ball roller 62 with the cam 63.

One of the features of my invention is that the rack 67 is so mounted that it is capable of self-adjustment for the purpose of causing its teeth to effectively intermesh with the teeth of the gear 66, independently of the rotative position of the gear at the instant it contacts the rack during its movement around the column 12. As shown in Figure 4, the contacting ends of the bracket 64 and the rack part 67 are overlapped and provided with interfitting or positioning shoulders. A stud bolt 68 is secured to the bracket 64 and extends through an aperture formed in the overlapping portion of the rack part 67 and also through a cylindrical buffer 69 and a metallic washer located at the outer end of the buffer. The head of the bolt 68 seats on this washer for the purpose of normally holding the rack part 67 in the position illustrated in Figure 4, with relation to the bracket 64. It will be understood that the buffer 69 is formed of resilient material and that the bolt receiving aperture in the rack 67, is of such size as to permit the rack to move relatively to the bracket 64—thus compressing or otherwise distorting the buffer 69, in case the teeth of the rack 67 do not immediately mesh with those of the gear 66 as the gear contacts the rack.

The cam 63 is illustrated in Figure 4 as so mounted on the bracket 64 that it is yieldingly held in its lowermost position by a coiled spring 70. The cam may be broadly described as a double wedge so formed that the ball roller 62 first engages a wedge-shaped portion of the cam, is moved downwardly by this engagement, is held in a depressed position by the intermediate portion of the cam and then moves out of engagement with the cam after passing along the other wedge-shaped portion thereof. The spring 70 prevents the spindle 58—59 and the cap 61 from exerting excessive pressure on the closure 65a of the container 65 in case of an improper adjustment of the cam or cam way.

In order to adjust the position of the cam way, the bracket 64 is formed in two parts, one of which is provided with a way in which a dovetailed portion of the other part fits and the two parts are secured together by a nut and bolt assembly 71. By this arrangement the vertical position of the cam way carrying part of the bracket 64 may be adjusted to accommodate containers of different height. The elongated gear engaging teeth of the rack 67 accommodate such an adjustment of the bracket and as previously noted retain the gear 66 in mesh with the rack as the gear moves downwardly in response to the cooperative action of the cam 63 and the ball roller 62.

The spindle 68—59 is yieldingly held in its uppermost position by a coil spring 72, which surrounds the spindle part 59 and seats on a countersunk shoulder formed at the upper end of the housing 47. In order to accommodate the periodic rotation of the spindle, the upper end of the spring seats on a washer or ball race 73 which surrounds the spindle and forms a bearing for a collar 74, shown as formed on the spindle part 59. The cap 61 secured to the lower end of the spindle 58—59, in effect, limits the extent of upward movement of the spindle 58—59. The threaded flange of this cap, which is secured to the lower end of the spindle, engages the inner face of the bell 55 and in this way limits the upward movement of the spindle.

Another feature of my invention is that the rotation of the gear 66 is imparted to the two part spindle by means of a friction clutch mechanism 75, the cooperating elements of which are yieldingly held in clutching engagement. As shown, the gear 66 is mounted on a sleeve bearing which surrounds the spindle and seats on the collar 74. The friction clutch 75 is shown as provided with a sleeve 76 which surrounds the spindle part 59, is splined thereto and is pressed into frictional engagement with the friction rings forming a part of the clutch. The friction rings are shown as losely surrounding the spindle part 59 and as supported by the gear 66. The clutch actuating pressure is imparted to the sleeve 76 by an adjustable ring nut 77, threaded onto the spindle part 59, through the agency of a ring-shaped cushion 78 shown in the form of a truncated cone located between the ring nut 77 and the sleeve 76. The cushion 78 is formed of resilient material such as rubber. With such an arrangement the clutch 75 can be so adjusted that it will slip after the closure engaged by the cap 61, has been screwed to sealing position. This avoids damaging either the containers 65 or their closures 65a.

The spindle 58—59 not only functions to control the closure sealing operation but also controls communication between the interior of each container 65 and the source of sub-atmospheric or vacuum pressure. For this reason the spindle part 58 of each device 14 is hollow from end to end and its upper end is so formed as to, in effect, constitute a valve cage which houses a valve disk 79 and is in open communication with the inner end of the nipple 46 carried by the housing 47 of the device. The stem 81 of the valve disk 79 extends downwardly through the hollow interior of the part 58 and projects into the cap 61 carried by the spindle part. The cap 61 is perforated as shown for the purpose of accommodating the free passage of air from the air bell 55 to the source of vacuum, through the interior of the spindle part 58, the nipple 46, the hose or flexible connection 45, and the control valve made up of the valve parts 31, 34 and 36 (Figure 1). The lower end of the valve stem 81 is fitted with a closure-engaging foot 82, which is rotatively mounted on the stem 81, preferably by means of a ball or antifriction bearing. The valve disk 79 is normally held to its seat, within the cage portion of the part 58, by means of a coil spring 83, the upper end of which is seated on an internal shoulder formed within the spindle part 59. The arrangement is such that the valve is opened—against the pressure of the spring 83—when the spindle moves downwardly and the foot 82 engages a closure on a container, thus checking the downward movement of the valve stem 81, and opening the valve. With such an arrangement the interior of the bell 55 and, consequently, the interior of the container 65 engaged by the bell, will not be exhausted, unless a container is engaged by the corresponding air bell 55 and unless that container is provided with a closure. That is to say, the valve disk 79 remains on its seat, unless lifted by the engagement of the foot 82, with a closure fitted on a jar.

The bell 55 is shown provided with a ring-shaped gasket or lip 84, which is held in place on the lip of the bell by means of a specially formed ring nut 85. By such an arrangement the gaskets 84 can be readily changed to co-operate with containers of different size and shape. As shown, the gasket is of such diameter that it is adapted to engage the shoulder of a jar or container 65 as the bell moves downwardly to enclose the mouth thereof and the closure 65a loosely fitted thereto. In this way, a hermetic seal is accomplished between the container and the interior of the bell, as a preliminary to exhausting the air from both the bell and the container.

Figures 2, 14:
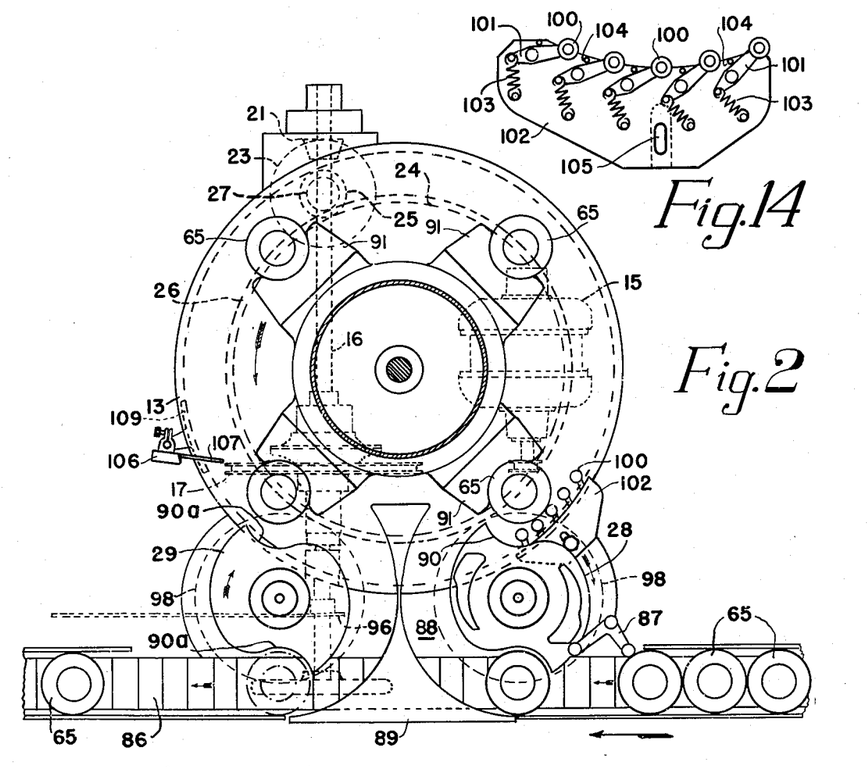
Figure 2 is a diagrammatic plan view of the machine shown in association with a conveyor mechanism which may be so associated with the machine as to form a part thereof.
Figure 14 is a somewhat diagrammatic view, on an enlarged scale, of a portion of the apparatus shown in Figure 2.
Figure 3:
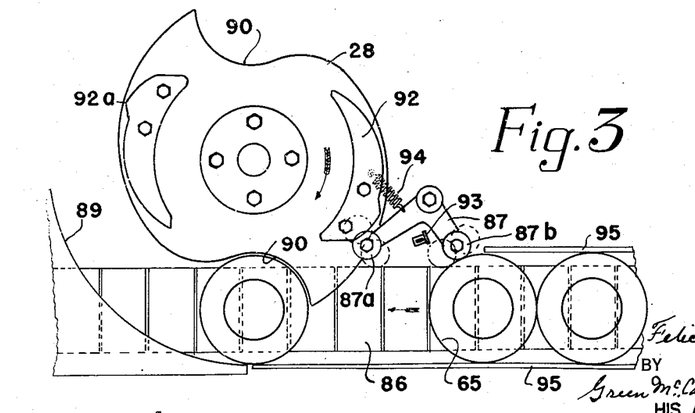
Figure 3 is a fragmental plan view and illustrates a part of the loading mechanism forming a detail of the machine disclosed in Figures 1 and 2.

Containers are placed on the rotating table 13 by the selector mechanism which includes a conveyor 86, the selector plate 28 and a cam actuated gate 87. As shown in Figure 2, the conveyor is located adjacent the table 13 and is on a level with the table and an intermediate stationary plate or table 88. The conveyor moves from right to left, as illustrated in Figure 2, and the gate 87 is actuated so as to periodically release a single container, located on the conveyor, so as to permit the conveyor to move that container into engagement with the edge of a directing plate 89 and to a position such that it will be engaged by the rotating selector plate 28 and thus propelled along the plate 89 and across the plate 88 onto the table 13.

The plate 28 is provided with two container receiving recesses 90, each of which is adapted to engage a container on the conveyor which has been released by the gate 87. The rotation of the plate 28 then moves the engaged container off the conveyor, across the stationary plate or table 88, onto the moving table 13 and into engagement with a positioning bracket 91 carried by the rotatable frame 49.

In the machine illustrated, four brackets 91 are employed and the arrangement is such that the cooperation between the rotating selector plate 28 and the bracket 91, moving with the table 13, is such as to position each container 65, moved onto the rotating table 13, immediately under an air bell 55 carried by one of the devices 14. For this reason the brackets 91 are adjustable and also removably mounted on the rotating frame 49, i. e., so mounted that each bracket may be readily adjustable and also that different brackets may be readily installed so as to accommodate containers of different sizes and shapes. It will be understood that each plate 28 makes two complete revolutions as the table makes one complete revolution.

The gate 87 illustrated is in the form of a bell crank lever and is actuated by first one and then the other of two cams 92 located 180° apart on the plate 28. The longer arm of the gate lever 87 carries a cam roller 87a and the shorter arm carries a fiber roller 87b which is adapted to move into and out of the path of travel of containers located on the conveyor. Gate 87 is normally held against a stationary stop 93 by means of a coil spring 94; one end of which is secured to the stationary frame of the machine and the other end of which is suitably coupled to the longer arm of the gate. The stop 93 is so positioned that the spring 94 normally holds the cam roller 87a in the path of travel of the cams 92 and the fiber roller 87b in the path of travel of containers on the conveyor. In this position of the gate, the fiber roller 87b constitutes a stop which, together with rails 95 along each side of the conveyor, holds containers located on the conveyor stationary thereby causing them to slide on the conveyor as the conveyor continues its forward movement. The rails are adjustable laterally of the conveyor to accommodate different size containers 65 and also to minimize the friction between the containers on the conveyor and the rails.

As each cam 92 engages the roller 87a, the gate is swung away from the stop 93 and as a result, the fiber roller 87b moves along the peripheral surface of the container 65 engaged by it. When the cam lobe 92a engages the cam roller 87a, the gate is swung to such a position that the fiber roller 87b is momentarily moved out of the path of travel of containers on the conveyor, with the result that all the containers move forward with the conveyor. The arrangement is, however, such that the gate releases but one container at a time and the timing of this release is such that the released container moves forward with the conveyor and is received by one of the recesses 90 of the plate 28 and moved thereby onto the table 13.

Centrifugal force occasioned by the rotation of the table 13 tends to move the containers 65 out of engagement with the brackets 91 after they are released by the selector plate 28. This tendency, of course, increases as the table is speeded up. For this reason I have provided a series of spring-pressed rollers 100 which cooperates with each bracket 91 in holding each successive container in place on the table, until the container is engaged by the lip 84 of a downwardly moving air bell 55. As shown in Figure 14, each roller is carried by a spring-positioned lever 101. The levers 101 are pivotally mounted between two plates 102, which constitute an auxiliary bracket. Each lever is provided with a separate actuating spring 103 which normally holds it against a stop 104. For convenience of illustration, the upper plate 102 is omitted from Figure 14, although it is diagrammatically illustrated in Figure 2.

As shown in Figure 2, the rollers 100 and their carrying bracket are mounted immediately adjacent the rotating table 13 and in such a position that the plates 102 are overlapped by the selector plate 28. As each container is moved onto the rotating table by the action of the selector plate 28, it is first engaged by one of the brackets 91, moving with the table. Such bracket and the selector plate cooperate in positioning the container on the table and in moving it to a position such that it is engaged by the first roller 100 of the series carried by the auxiliary bracket. As the container moves with the bracket 91, it is engaged by the successive rollers 100 and is thus yieldingly held against the bracket 91 by one or another of these rollers until it is gripped by an air bell 55.

The foregoing description, taken in connection with the drawings, discloses that the vacuum pack machine here illustrated positions four containers or jars on the rotating table 13 during each revolution of the table, as a preliminary step in "vacuumizing" and sealing such jars. This makes it apparent that the four jars so positioned are also removed from the table after they have moved with the table around the stationary column 12. Thus, it is apparent that during each revolution of the table 13 the cooperative action of each cam roller 53 with the cam way 54 moves its corresponding or carrying bracket 48 up and down and, therefore, occasions a movement of each device 14 to its lowermost position, in which the corresponding air bell 55 engages a container positioned below it on the table 13. This downward movement of each device 14 causes the corresponding foot 82 of the valve stem 81 to engage the lid or closure of the bell-engaged container and to lift the valve disk 79 from its seat thus placing the air bell in communication with the valve assembly 31—34—36 thereby exhausting the air from the air bell and the interior of the engaged container. After the air has been exhausted from the container 65, the ball roller 62 of the corresponding device 14 moves into engagement with the cam 63 thus actuating the spindle 58—59 to yieldingly force the depending rim of the cap 61 into gripping engagement with the closure 65a loosely fitted to the container 65. This downward movement of the spindle 58—59 and the cap 61 is accomplished while the cap is revolving in response to the rotation of the gear 66, occasioned by its intermeshing engagement with the teeth of the rack portion 67. It will, of course, be understood that the timing of the downward movement and the rotation of the cap 61 can be varied to suit each particular type of closure employed but the cooperative action will always be such as to hermetically seal each container 65 at a time when both its interior and the air bell are subjected to a substantially complete vacuum.

After the sealing is accomplished, the ball roller 62 moves off of the cam way 63 permitting the spring 72 to lift the spindle and the cap 61. The cam roller 53 and cam way 54 also cooperate to move the bracket 48 upwardly to a position such that the air bell not only frees the container previously engaged by it but moves to a position such that it clears the upper end of the closure of the container, as the container is moved off of the rotating table 13.

Figure 5:
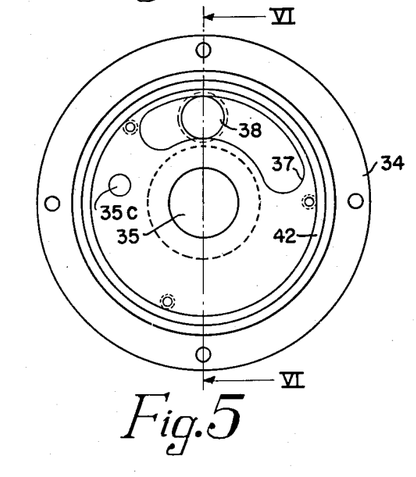
Figure 5 is a plan view of a portion of a vacuum-control valve forming a part of the machine.
Figure 6:
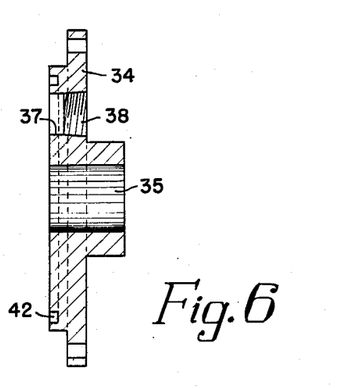
Figure 6 is a sectional elevation of the part shown in Figure 5; the section being taken along the line VI—VI.

In order to prevent the upward movement of each air bell from lifting the container 65 engaged by it, it is desirable to shut off communication between the interior of the air bell and the source of vacuum prior to raising the air bell. This is accomplished by the vacuum-control valve assembly 31—34—36 which is so synchronized with the movement of the table 13 that it controls the application of vacuum to each air bell and the duration of such application. It times communication between each bell 55 and the source of vacuum so that vacuum can only be applied to the bell, after the bell has moved downwardly into engagement with a container on the table 13. Likewise, the closing off of such communication is timed to take place after the spindle 58—59 has been actuated by the cam 63. Prior to the lifting of each air bell 55, it is vented to the atmosphere by the cooperative action of air vents 35c and 36c formed respectively in the valve part 34 and the control plate 36 of the control valve assembly 31—34—36 (Figures 5 and 9). That is to say, as each aperture 31a of the valve part 31 moves across the control plate 36, it moves out of register with the aperture 36a and then into register with the air vent 36c of the plate and vents the corresponding bell to the atmosphere. The ports 35c and 36c are always in register and the port 35c is always open to the atmosphere.

The primary function of the valve disk 79 is to prevent the application of vacuum to an air bell, unless the air bell is in operative engagement with a container and the container so engaged is fitted with a closure. The assembly, of which the disk 79 forms a part, also functions to aid in the release of the associated container from the air bell after the bell has been vented to the atmosphere and is moving upwardly. As to this, it will be apparent that the spring 83 yieldingly forces the disk 79 toward its seat and, consequently, yieldingly forces the foot 82 into engagement with the cover 65a carried by the associated container 65. For this reason the force of the spring 83 tends to push the container away from the air bell as the air bell lifts and, therefore, tends to prevent the associated air bell from lifting the container off of the table 13.

Too much pressure on a closure 65a during the operation of withdrawing air from the air bell may prevent the complete withdrawal of air from the associated container. Excess pressure might also damage the closure. For this reason, it is desirable to employ relatively light spring pressure in holding the foot 82 against the closure. The springs 83, therefore, cannot be relied upon to eject containers from the air bells under all conditions of operation. I have, therefore, provided means for automatically stopping the machine, in case a container is lifted off the table by an air bell, or by the closure-sealing apparatus.

A portion of the automatic stop mechanism is shown in Figures 2 and 4 and, as there illustrated, consists of a microswitch 106, which is actuated by a spring wire trip 107. The switch is included in or associated with the circuit which delivers current to the motor 15 and is so arranged that when the wire or rod 107 is deflected it acts to open the current delivery circuit. Microswitches are well known commercial devices and for that reason need no further description, except to say that the microswitch 106 is carried by a rod 108 which is adjustably mounted in a bracket 109 carried by the stationary frame 11 of the machine. By this arrangement, the microswitch may be so positioned that its actuating wire 107 is out of the normal path of travel of the shoulders of containers 65 properly positioned on the table 13 but will be engaged by the shoulder of a container and stop the machine, if the container is raised above the table 13 by an air bell or closure-sealing mechanism at the time it passes the microswitch 106

The movement of the vacuum sealed containers off of the table 13 is accomplished by the delivery plate 29 (Figures 1 and 2). The action of this plate is somewhat similar to that of the plate 28 and the two plates are duplicates except that the plate 29 is not provided with the cams disclosed and described in connection with the plate 28. The plate 29 is substantially the same size and shape as the plate 28, is provided with two container-engaging recesses 90a, rotates in the same direction as that of the plate 28 and rotates twice during each revolution of the table 13. During each such rotation, one of the recesses 90a engages a container carried by and moving with the table 13 and moves it along a directing edge of the plate 89 across the plate 88 and again onto the conveyor 86. As shown, the conveyor may be driven by a pulley 96, secured to the shaft 16.

As disclosed in Figure 1, the plate 29 is carried by a vertical shaft 97 which extends through a suitable bearing, formed in a part of the frame of the machine, and is provided at its lower end with an operating gear 98. The gear 98 meshes with the bull gear 26. The mounting of the shaft 97 and its operating gear 98 is similar to that of the shaft 30 and the bull gear 26. The shaft 97 is provided with a collar 97a which constitutes a step bearing for the shaft and the operating gear 98 is secured to the lower projecting end of the shaft, and with the collar 97a hold the shaft 97 against undue vertical or longitudinal movement. The plate 29 extends horizontally and is so positioned above the level of the table 13 and the conveyor 86 that it is adapted to engage an intermediate portion of the containers moved by it from the table to the conveyor.

For convenience of illustration and brevity of description, I have not illustrated the mounting shaft and operating mechanism for the plate 28. It may be said, however, that the mounting shaft of the plate 28 extends vertically, that the operating mechanism corresponds to that of the plate 29 and that the two plates are located at substantially the same level above the table 13.

While the valve mechanism—of which the disk 79 (Figure 4) forms a part—opens and closes off communication between each air bell 55 and the valve assembly 31—34—36, the normal application of vacuum to each air bell is controlled by that assembly. As a result, the groove 37 of the plate 34 and the slot 36a of the plate 36 are so positioned with relation to the moving valve part 31 and its apertures 31a, that the application of vacuum to each air bell is so synchronized with the movement of the air bell that vacuum is not applied until after the bell has engaged a container on the table 13. As previously described, the withdrawal of air from each container, in establishing a vacuum therein, is then a relatively gradual procedure but the arrangement is such that the interior of each container is subjected to substantially vacuum pressure before the spindle 58—59 and the cap 61 are moved to force the closure 65a to sealing position on the container. After this is accomplished, communication between the respective air bell and the source of vacuum is cut off, the bell is vented to the atmosphere and then lifted. The lifting of each device 14 eventually raises the foot 82, of the valve stem 81, off the sealed closure thus permitting the spring 83 to move the valve disk 79 to its seat and close off communication between the corresponding air bell 55 and the valve assembly 31—34—36.

While it is essential to control the rate at which full vacuum is applied to each container 65, the specific details of the apparatus for accomplishing this may be modified materially. For example, an arc-shaped series of drilled holes of gradually increasing size may be substituted for the arc-shaped portion of the slot 36a without detracting from the effectiveness of the apparatus. This substitution also simplifies and cheapens the operation of producing the plate 36.

The closure engaging caps 61 are removable so that different caps may be applied to the machine to suit the type of closures involved. The type of material involved by the vacuum packing opertion may also require or permit some change as to the rate of applying vacuum to the interior of the containers involved. For this reason the plate 36 is removable and replaceable, in order that the rate at which vacuum is applied to the containers may be varied.

Figures 11, 12, 13:
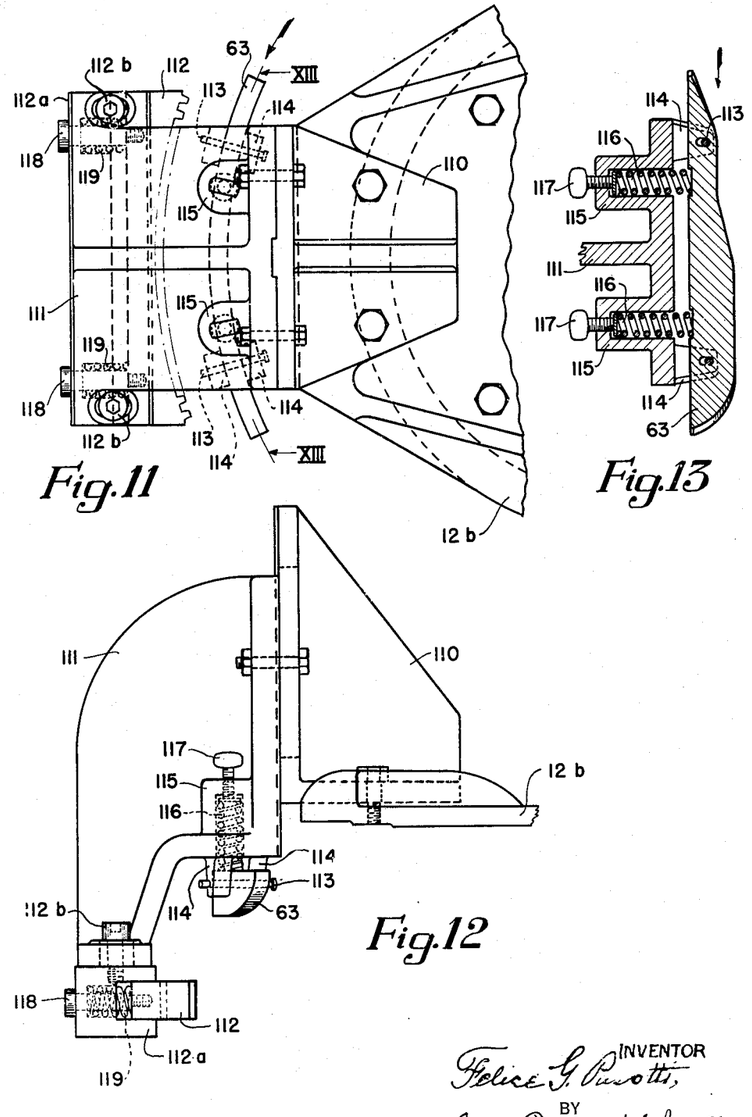
Figure 11 is a fragmental plan view of a portion of the machine and discloses a preferred form of bracket for supporting a cam and a gear actuating rack, which constitute details of my invention.
Figure 12 is a side elevation of the bracket shown in Figure 11.
Figure 13 is a sectional view along the line XIII—XIII of Figure 11 and discloses a spring-pressed cam.

In Figures 11 and 12, I have shown a modified form of the cam and rack supporting bracket. As illustrated, the cylindrical portion 12 of the stationary frame is provided with a cover plate 12b. This cover plate carries a bracket support 110 provided with a vertical guide for the reception of the bracket 111. This bracket 111 performs the function of the bracket 64 of Figure 4 and supports the cams 63 and also a rack 112, which is the equivalent of, or a substitute for, the rack part 67 of Figure 4. As shown, the cam 63 is arc-shaped for the purpose of accommodating the movement of the ball roller 62 as it travels with the table 13. It is supported by pins 113, each of which extends through an elongated slot formed in, and extending transversely of the cam. Each pin 113 is carried by a pair of depending lugs 114 formed on the bracket 111 so that the cam 63 is, in effect, suspended between the lugs by the pins 113. The bracket is also provided with two spring sockets 115, each of which receives one end of a coil spring 116 which engages the upper face of the cam 63 and yieldingly holds the cam in its lowermost position with relation to the elongated slots formed therein. The bracket 111 is provided with a separate thumb screw 117 for adjusting the pressure of each spring 116.

The bracket is also provided with a depending portion which projects below the cam 63 and forms a support for the rack 112. As shown, the rack is mounted in a holder 112a which is secured to the bracket by stud bolts 112b. The holder 112a is channel-shaped and so arranged that the channel opens laterally and receives the rack 112. The innermost wall of the channel is apertured to receive stud stripper bolts 118, each of which is surrounded by a coil spring 119 and is screwed into a tapped aperture formed in the rear face of the rack 112. By this arrangement the rack is yieldingly held in its operative position and thus permitted to adjust itself to properly mesh with the gear 66 (Figure 4) as that gear moves into engagement with it.

In the illustrated embodiment of the rack, as disclosed in Figure 4, and also in Figures 11, 12 and 13, each gear 66 is engaged by the rack once during each revolution of its associated mechanism 14 around the central column 12. It will be understood that the rotation imparted to the closure-engaging cap 61 by the rack and gear assembly, is essential only where the closure employed is one such as requires a turning motion to move it to sealing position. Where another type of closure is employed, a downward movement of the cap 61, or equivalent device, may be all that is necessary to accomplish a seal. Under such circumstances the rack and gear assembly may be dispensed with. It will be apparent that a circular rack could be employed instead of the segmental rack illustrated and, if employed, the cap 61 would rotate continuously. This, however, is not necessary and a circular rack would materially add to the cost of the machine.

It will be understood that changes and substitutions, other than those herein described and suggested, may be made in the machine illustrated and that various modifications, additions and omissions may be made in that machine without departing from the spirit and scope of the invention as defined by the appended claims.

What I claim is:

1. In a machine for sealing containers under vacuum, a movable support for containers to be sealed; means for moving said support; an air bell movable with said support; means for moving said bell to engage and disengage a container on said support; and an automatic stop mechanism positioned to engage a container engaged by and moving with said air bell during a disengaging movement of said bell, and to stop the movement of said support and said bell.

2. In a machine for sealing containers under vacuum, a rotatable support for containers to be sealed; means for rotating said support, air bells spaced around and movable with said support; means for moving each such air bell toward and away from said support, to engage and disengage a container on said support during the movement of the same; and an automatic stop mechanism provided with means to engage a container lifted by and moving with one of said air bells during the disengaging movement of the same and to thereby stop the rotation of said support and the movement of said air bells.

3. In a machine for sealing containers under vacuum, a rotatable support for containers to be sealed; means for rotating said support; air bells spaced around and movable with said support; means for moving each such air bell into and out of engagement with a container on said support during the movement of such container with said support; and a stop mechanism engaged and actuated by a container engaged by and moving relatively to said support with any one of said air bells during the disengaging movement such bell, to stop the movement of said support and said bells.

4. In a machine for sealing containers under vacuum, a support for containers to be sealed, an air bell movable toward and away from said support to engage and disengage containers on said support; an automatic stop mechanism actuated by a container moving with said air bell during a disengaging movement thereof to stop the movement of said air bell.

5. In a machine for sealing containers under vacuum, a movable support for containers to be sealed; means for moving said support; a source of vacuum pressure; a combined vacuum-applying and closure-sealing mechanism carried by said support and movable toward and away from the container supporting surface thereof and comprising a substantially cylindrical open ended housing, a container-engaging air bell carried by said housing and axially aligned therewith, a closure engaging cap located centrally within said bell, an actuating spindle for said cap extending upwardly through said housing and axially aligned therewith, a vacuum control valve located within said spindle with the stem thereof extending downwardly through said spindle and through said cap and axially aligned with said spindle and said cap, a closure engaging foot carried by said stem and a spring located within said spindle for holding said valve closed and said foot in an extended closure-engaging position; means for reciprocating said housing during the movement of said support to move said air bell into and out of engagement with a container carried by the support, and said foot into and out of engagement with closures carried by such containers; means for moving said spindle longitudinally of said housing during the movement of said support to move said cap into and out of engagement with a closure engaged by said foot and carried by a container engaged by said bell; and means connecting the interior of said spindle with said source of vacuum.

6. In a machine for sealing containers under vacuum, a source of vacuum; a rotatable support for containers to be sealed; means for continuously rotating said support; means operative during rotation of said support for moving onto said support a succession of containers each having a closure loosely fitted thereon; a combined vacuum applying and closure sealing mechanism moving with said support and movable relatively thereto toward and away from the container supporting surface thereof and comprising an open ended housing having a port intermediate its ends in communication with said source of vacuum, a container-engaging air bell mounted on the lower end of said housing, a closure-engaging cap located centrally within said bell, an actuating spindle for said cap extending through said housing and having a delivery passage formed therein communicating with said bell and the interior of said housing, a valve carried by said spindle for controlling communication between said source of vacuum and said bell through said spindle passage, a closure-engaging stem for said valve extending co-axially with said spindle through said passage and projecting through said cap to a closure-engaging position within said bell; means for moving said mechanism toward and away from the container supporting surface of said support to cause said bell to engage and disengage containers on said support and said stem to engage and disengage closures carried by such containers and to thereby open and close said valve; means for rotating said spindle and said cap while said stem is in a closure-engaging position; means for reciprocating said spindle longitudinally of itself during such rotation to move said cap into and out of engagement with closures on containers engaged by said bell; yielding means for closing said valve and imposing an ejecting force on a container engaged by said bell as said bell moves to disengage such container.

7. In a machine for sealing containers under vacuum, a rotatable support for containers to be sealed; means for rotating said support; a source of vacuum pressure; a combined vacuum applying and closure sealing mechanism carried by said support movable therewith and movable toward and away from the container supporting surface thereof during the rotation of said support and comprising a housing having a port formed therein communicating with said source of vacuum, a container-engaging air bell carried by said housing, means for yieldingly holding said bell in a container-engaging position with relation to said housing, a closure-engaging cap located centrally within said bell, an actuating spindle for said cap axially aligned therewith and extending upwardly through said housing and having an air delivery passage formed therein communicating at one end with the interior of said bell and at the other end with the interior of said housing, a valve carried by said spindle for opening and closing communication between said passage and said port, a closure-engaging stem for said valve extending co-axially with said spindle through said passage and projecting through said cap to a closure-engaging position within said bell, and a spring carried by said spindle for yieldingly holding said valve in the passage closing position and the stem thereof in an extended closure-engaging position; means for moving said combined mechanism toward and away from the container supporting surface of said support to cause said bell to engage and disengage containers on said support and said stem to engage and disengage closures carried by such containers and to thereby open and close said valve; means for reciprocating said spindle to move said cap into and out of engagement with a closure on a container engaged by said bell; and means for rotating said spindle and said cap while said stem and said cap are in closure-engaging position.

8. In a vacuum pack and container-sealing machine, a support for containers to be vacuum sealed; means for moving said support; a source of vacuum pressure; a combined vacuum-applying and closure-sealing mechanism movable with said support and relatively thereto toward the container-supporting surface thereof and comprising, an open-ended housing; a container-engaging air bell depending from and yieldingly supported on said housing; a closure-engaging cap located within said bell and movable relatively thereto; a hollow, actuating spindle for said cap extending into said housing and with the hollow interior thereof in communication with said source of vacuum and with said air bell; a valve carried by said spindle for controlling communication between said source of vacuum pressure and said bell; a stem secured to said valve, depending therefrom and extending through said spindle and said cap into said air bell; a spring located within said spindle for holding said valve closed and the end of said stem in a closure-engaging position below said cap; and means for reciprocating said housing during movement of said support to move said bell into and out of engagement with a container carried by said support.

9. In a vacuum pack and container-sealing machine, a support for containers to be vacuum sealed; means for moving said support; a source of vacuum pressure; a combined vacuum-applying and closure-sealing mechanism movable with said support and relatively thereto toward and away from the container-supporting surface thereof and comprising, a housing in open communication with said source of vacuum pressure; a container-engaging air bell depending from and yieldingly supported on said housing; a closure-engaging cap located within said bell and movable relatively thereto; a hollow actuating spindle for said cap secured thereto and extending into said housing with the hollow interior thereof in communication with said source of vacuum pressure and with said air bell; means carried by said housing for yieldingly supporting said spindle in a raised position with relation to said housing; a valve carried by said spindle for controlling communication between said bell and said source of vacuum pressure; a stem secured to and depending from said valve and extending through said spindle and said cap into a closure-engaging position within said bell; a spring operating between said spindle and said valve for holding the valve closed and the end of said stem in a closure-engaging position within said bell and below said cap; means for reciprocating said housing to move said bell to and from a container-engaging position relatively to said support; and means for moving said spindle relatively to said housing to actuate said cap and move said valve stem into valve-opening engagement with the closure on a container engaged by said bell.

10. In a vacuum pack and container-sealing machine, a support for containers to be vacuum sealed; means for moving said support; a source of vacuum pressure; a combined vacuum-applying and closure-sealing mechanism movable with said support and relatively thereto toward the container-supporting surface thereof and comprising, an open-ended housing; a container-engaging air bell depending from and yieldingly supported on said housing; a closure-engaging cap located within said bell and movable relatively thereto; a hollow, actuating spindle for said cap extending into said housing and with the hollow interior thereof in communication with said source of vacuum and with said air bell; a valve carried by said spindle for controlling communication between said source of vacuum pressure and said bell; a stem secured to said valve, depending therefrom and extending through said spindle and said cap into said air bell; a spring located within said spindle for holding said valve closed and the end of said stem in a closure-engaging position below said cap; means for reciprocating said housing during movement of said support to move said bell into and out of engagement with a container carried by said support; means for reciprocating said spindle and said cap relatively to said housing; and means for rotating said spindle.

11. In a vacuum pack and container-sealing machine, a stationary frame; a source of vacuum pressure; a container-supporting table movably mounted on said frame; a housing movably mounted on said frame; a container-engaging air bell carried by said housing; a closure-engaging cap located within said bell and movable with relation thereto; a hollow actuating spindle for said cap, secured thereto, extending upwardly into said housing and with the hollow interior thereof in communication with said bell and said source of vacuum pressure; a valve carried by said spindle for controlling communication between said source of vacuum pressure and said bell; a valve stem secured to said valve and extending through said spindle and said cap into a closure-engaging position within said bell; means for reciprocating said housing with relation to said table to move said bell to and from a container-engaging position with relation to said table; and means carried by said frame for periodically depressing said spindle to move said cap and said valve stem into closure-engaging position relatively to said bell.

12. In a vacuum pack and container-sealing machine, a stationary frame; a source of vacuum pressure; a container-supporting table movably mounted on said frame; a housing movably mounted on said frame; a container-engaging air bell carried by said housing; a closure-engaging cap located within said bell and movable with relation thereto; a hollow actuating spindle for said cap, secured thereto, extending upwardly into said housing and with the hollow interior thereof in communication with said bell and said source of vacuum pressure; a valve carried by said spindle for controlling communication between said source of vacuum pressure and said bell; a valve stem secured to said valve and extending through said spindle and said cap into a closure-engaging position within said bell; means for reciprocating said housing with relation to said table to move said bell to and from a container-engaging position with relation to said table; means carried by said frame for periodically depressing said spindle to move said cap and said valve stem into closure-engaging position relatively to said bell; and means for rotating said cap while said spindle is depressed.

13. In a machine for sealing containers under vacuum, a movable support for containers to be sealed; means for moving said support; an air bell movable with said support; means for moving said bell to engage a container on said support during movement of said support; separate means, acting successively during the movement of said support, for reducing the air pressure within said bell and said container, for sealing said container while the air pressure within said bell is so reduced, for venting the interior of the bell to the atmosphere, and for moving said bell to disengage the container on the support engaged thereby; means acting during the disengaging movement of said bell to apply a disengaging force to said container; and a stop mechanism positioned to be engaged by a container engaged by said bell during a disengaging movement of said bell, for stopping the movement of said support when so engaged.

14. In a machine for sealing containers under vacuum, a movable support for containers to be sealed; means for moving said support; an air bell movable with said support; means for moving said bell into and out of engagement with a container on said support; a source of vacuum pressure; separate means, acting successively during movement of said support and while said bell engages a container on said support, for placing the interior of said bell in communication with said source of vacuum, for sealing the container engaged by said bell while the bell communicates with said source, for venting the interior of said bell to the atmosphere and for applying a disengaging force to such container simultaneously with the movement of said bell to disengage the same; and means, positioned to be actuated by a container in engagement with said bell after disengaging movement of said bell, for stopping the movement of said support when so actuated.

15. In a vacuum pack and container sealing machine, a moving support for containers to be sealed; a source of vacuum pressure; a combined vacuum-applying and closure-sealing mechanism comprising, a housing movable with said support and movable relatively thereto toward and away from a closure-carrying container located on said support, a container-engaging air bell depending from and yieldingly supported on said housing, a cap located within the confines of said bell for engaging and applying a sealing force to a closure carried by a container engaged by said bell, a tubular carrier for said cap yieldingly supported on said housing and in open communication with the interior of said bell, a valve seated on said tubular carrier and movable relatively thereto to control communication between said source of vacuum pressure and the interior of said bell, and a closure-engaging stem secured to said valve projecting into a closure-engaging position within said bell; means for actuating said housing to move said bell into engagement with a container located on said support and to move said valve stem into valve-opening engagement with a closure carried by such container; and means for actuating said carrier to move said cap into a closure-applying position with relation to such container and the closure carried thereby, while said valve is off its seat and said bell engages such container.

16. In a machine for applying vacuum pressure to a container and for sealing the same while vacuum is applied thereto, a support for containers to be vacuum sealed; means for moving said support; a source of vacuum pressure; a combined vacuum-applying and closure-sealing mechanism including a housing movable with said support and movable relatively thereto toward and away from a closure-carrying container located on said support, an air bell for engaging such a container, depending from said housing, a cap for engaging and sealing a closure carried by a container located on said support and engaged by said bell, and a tubular carrier for said cap in open communication with the interior of said bell and movably supported by said housing; a periodically opening valve actuated in synchronism with the movement of said support for controlling communication between said source of vacuum and said tubular cap-carrier; a second valve seating on said carrier; a stem for said valve extending through said carrier and into a closure-engaging position within said bell; means operating through the medium of said housing for moving said bell into engagement with a container located on said support and said valve stem into engagement with a closure carried by such container engaged by said bell; and separate means for moving said carrier and said cap to apply a sealing force to such closure.

17. In a machine for applying vacuum to a container and for sealing the same while a vacuum is applied thereto, comprising a support for containers to be sealed; a source of vacuum pressure; an air bell movable to and from a vacuum-applying position with relation to a container on said support; a closure-sealing cap located within the confines of said air bell for applying a sealing force to a closure carried by a container located on said support and engaged by said bell; a normally closed valve for controlling communication between said source and the interior of said bell; a valve-opening stem secured to said valve and extending into a closure-engaging position within said bell; means for moving said bell into a vacuum-applying position with relation to a container on said support and for moving said stem into valve-opening engagement with a closure carried by a container engaged by said bell; and means for moving said cap to engage and seal such closure while said valve is open and said bell is in vacuum-applying engagement with such container.

18. In a machine for applying vacuum to a container and for sealing the same while vacuum is applied thereto, comprising a support for containers to be sealed; a source of vacuum pressure; an air bell movable to and from a vacuum-applying position with relation to a container on said support; a control valve for controlling the rate of applying vacuum to the interior of said bell; a closure-sealing cap located within the confines of said bell for applying sealing force to a closure carried by a container located on said support and engaged by said bell; a normally closed valve located between said control valve and the interior of said bell; a valve-opening stem secured to said last mentioned valve and extending into a closure-engaging position within said bell; means for moving said support and for actuating said control valve; means for moving said bell into a vacuum-applying position with relation to a container on said support and for moving said stem into valve-opening engagement with a closure carried by a container engaged by said bell; and means for moving said cap to engage and seal such closure while said bell is in vacuum-applying engagement with such container and is in open communication with said source through both said valves.

19. In a machine for applying vacuum to a container and for sealing the same while vacuum is applied thereto, comprising a support for containers to be sealed; a source of vacuum pressure; an air bell movable to and from a vacuum-applying position with relation to a container on said support; a control valve for controlling the rate of applying vacuum to the interior of said bell; a closure-applying cap located within the confines of said bell for engaging and applying a sealing force to a closure carried by a container located on said support and engaged by said bell; an intermediate valve located between said control valve and the interior of said bell; means for moving said bell into a vacuum-applying position with relation to a container on said support; means for opening said intermediate valve during such movement of said bell; means for actuating said control valve, after said intermediate valve is open, to place said bell in communication with said source; and means for moving said cap to engage and seal such closure while said bell is in vacuum-applying engagement with such container and both said valves are open.

FELICE GEORGE PASOTTI.

REFERENCES CITED

The following references are of record in the file of this patent:

UNITED STATES PATENTS

| Number | Name | Date |
|---|---|---|
| 111,264 | Shipley | Jan. 24, 1871 |
| 1,264,843 | Norton et al. | Apr. 30, 1918 |
| 1,299,419 | Bendix | Apr. 8, 1919 |
| 1,751,591 | McCloskey | Mar. 25, 1930 |
| 1,965,246 | Meyer | July 3, 1934 |
| 2,120,272 | Williams et al. | June 14, 1938 |
| 2,126,942 | Barnby | Aug. 16, 1938 |
| 2,135,059 | Uren | Nov. 1, 1938 |
| 2,295,692 | Safranski et al. | Sept. 12, 1942 |
| 2,343,104 | Williams | Feb. 29, 1944 |